E. Fitzgerald,
Bread Machine,
N° 33,432. Patented Oct. 8, 1861.
Fig: 1.
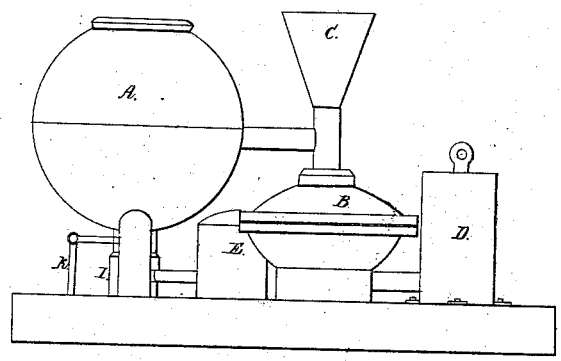
Fig: 2.
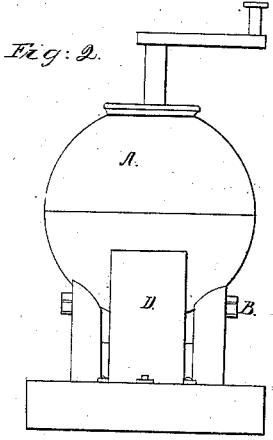
Fig: 3.
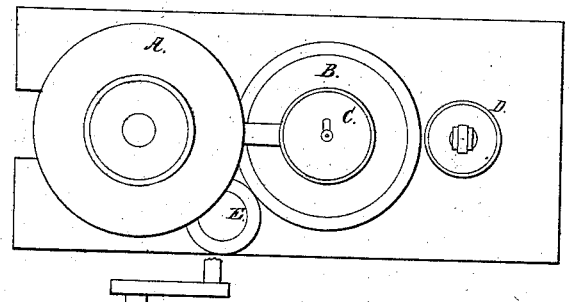
Fig: 4.
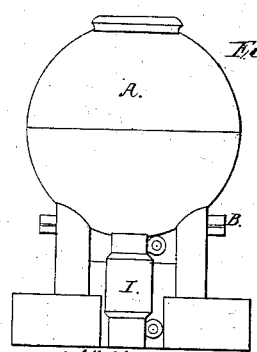
Fig: 5.
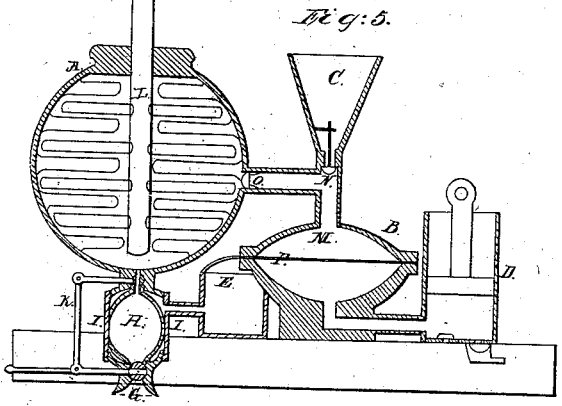
Fig: 6.
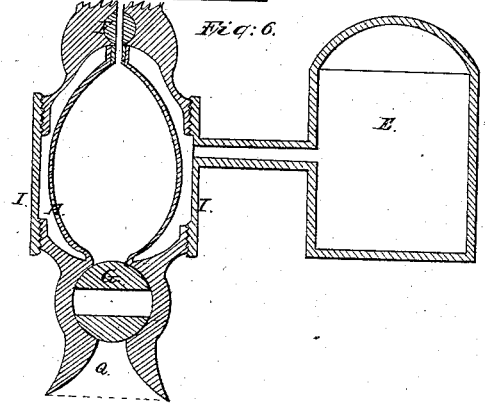
Witnesses:
Inventor:
Elisha Fitzgerald

UNITED STATES PATENT OFFICE.

ELISHA FITZGERALD, OF NEW YORK, N. Y.

IMPROVEMENT IN MIXING DOUGH.

Specification forming part of Letters Patent No. 33,432, dated October 8, 1861.

*To all whom it may concern:*

Be it known that I, ELISHA FITZGERALD, of the city, county, and State of New York, have invented a new and useful Process of Aerating Paste or Dough in the Business of the Baker; and I hereby declare that the following is a full and exact description thereof.

To enable others to make and use my invention, I proceed to detail the process, reference being had to the drawings hereunto annexed and making part of this specification.

Figure 1 is a side elevation of apparatus used in the process; Fig. 2, rear end of the same; Fig. 3, plan; Fig. 4, front end; Fig. 5, section; Fig. 6, diagram, enlarged, of flexible bag and measuring-chamber which may be attached to the apparatus.

The same letters refer to the same things in all the illustrations.

A is the receiver, into which the prepared paste or dough (consisting of flour and water and salt mixed) is thrust against pressure, to be there aerated—that is, charged with carbonic-acid gas; B, the division-pump used in the process; C, the hopper in which the mixed paste is put, to be thence pumped into the receiver by the action of the division-pump B; D, the acting pump; E, reservoir of air or gas; F, the upper valve or faucet which admits the dough into the measuring-bag when this apparatus is attached; G, the lower valve; H, the bag; I, the case; K, the lever, (the portion of the apparatus described and illustrated by the letters E, F, G, H, I, and K have no other purpose in this application than to show the connection of the measuring apparatus with the apparatus proper to this process of forcing paste into the receiver;) L, the mixer; M, the upper chamber of the division-pump; N, the valve at the throat of the hopper, admitting the prepared paste to the division-pump; O, the valve admitting the prepared paste to the receiver; P, the division between the two parts of the pump, which must always be of flexible material, and Q the outlet by which the aerated paste or dough is let out into the pan for baking.

The process described is rendered necessary for economy's sake in unfermented aerated bread, for when the contents of the receiver have been drawn out at the orifice Q it must again be filled with the materials and the atmosphere pumped out and the carbonic-acid gas pumped in before any more can be drawn out. To obviate this delay I have designed this process, and with the apparatus described I am enabled to keep the receiver constantly supplied with a prepared paste made of flour and water and salt without being obliged to open it or admit the atmospheric air.

I proceed to describe the process: I mix the flour and water and add the proper seasoning of salt before mixing. I mix these ingredients in a proper tub or trough and keep the mixed and prepared paste thus made ready for use. I fill the hopper and set the pump D working.

By the action of the pump hereinafter described the paste in the hopper is drawn down (the atmospheric pressure forcing it) into the upper chamber M, Fig. 5, of the division-pump. The return-stroke of the piston of the pump D forces the paste through the valve O into the receiver, (against the pressure of the carbonic-acid gas which is then during the mixing to be incorporated with the paste,) and it is there mixed and fully aerated or carbonated. This is the whole process. It consists only of forcing a prepared paste into the receiver against pressure to obviate opening it when it needs replenishing.

The pump D works with water or any incompressible fluid, and is constantly emptied and refilled with the same liquid.

This division-pump, heretofore allowed to me by the Patent Office, is the kind I have found best; but many kinds of pumps would serve the purpose.

What I claim as my invention, and desire secure by Letters Patent, is—

Forcing the paste into the receiver A against the pressure of the gas, substantially as described and set forth.

ELISHA FITZGERALD.

Witnesses:
 OWEN G. WARREN,
 J. D. STURTEVANT.